(12) United States Patent
Vajravel et al.

(10) Patent No.: US 11,611,594 B1
(45) Date of Patent: Mar. 21, 2023

(54) ENABLING RESOURCE SHARING IN A MULTI-CLIENT SCENARIO

(71) Applicant: Dell Products L.P., Round Rock, TX (US)

(72) Inventors: Gokul Thiruchengode Vajravel, Bangalore (IN); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 18 days.

(21) Appl. No.: 17/528,354

(22) Filed: Nov. 17, 2021

(51) Int. Cl.
*H04L 65/401* (2022.01)
*H04L 67/306* (2022.01)
*H04L 65/403* (2022.01)
*H04L 67/01* (2022.01)

(52) U.S. Cl.
CPC .......... *H04L 65/401* (2022.05); *H04L 65/403* (2013.01); *H04L 67/01* (2022.05); *H04L 67/306* (2013.01)

(58) Field of Classification Search
CPC . H04L 65/4007; H04L 65/403; H04L 67/306; H04L 67/42
USPC ........................................................ 709/227
See application file for complete search history.

(56) References Cited

U.S. PATENT DOCUMENTS

| | | | |
|---|---|---|---|
| 2013/0110936 A1* | 5/2013 | Miura | H04W 12/08 709/204 |
| 2021/0181938 A1* | 6/2021 | Hassan | G06F 3/011 |
| 2021/0351946 A1* | 11/2021 | Chanda | H04L 12/1818 |

* cited by examiner

*Primary Examiner* — Nicholas R Taylor
*Assistant Examiner* — Chong G Kim
(74) *Attorney, Agent, or Firm* — Kirton McConkie; Brian Tucker

(57) ABSTRACT

Resource sharing can be enabled in a multi-client scenario. A service can be employed on client computing devices to detect when the client computing devices are connected to a display. The service can communicate with a management server to report when the client computing device is connected to a display. The management server can maintain information about the displays to which the client computing devices are connected. When the management server determines that a multi-client scenario exists, such as when multiple client computing devices are connected to the same display, the management server can provide information to the services on the client computing devices to enable the services to configure the client computing devices to share resources. When the management server determines that the multi-client scenario no longer exists, it can interface with the services to cause them to prevent further sharing of resources.

20 Claims, 13 Drawing Sheets

301

| Client Computing Device | | | | Display UUID | User | |
|---|---|---|---|---|---|---|
| UUID | MAC | IP | State | | SID | State |
| fed737d8-a1c4-42e9-80c9-2bb99a1454743 | 40-74-E0-24-B8-C6 | 172.17.206.25 | Active | BBDE08FF | User-A SID | Logged In |
| 91f3ae9f-d0d4-4232-93aa-14869.4690c82 | 40-74-E0-5B-6F-BF | 172.17.106.100 | Locked | B65FDA69 | User-B SID | Logged In |
| deb160bb-becb-4774-9e6f-cd51cd307967 | 40-74-E0-4A-CC-D4 | 172.17.206.54 | Active | BBDE08FF | User-A SID | Logged In |
| ... | | | | | | |

302

Display UUID BBDE08FF

| Device No. | UUID | MAC | IP | User SID | Role |
|---|---|---|---|---|---|
| 1 | fed737d8-a1c4-42e9-80c9-2bb99a1454743 | 40-74-E0-24-B8-C6 | 172.17.206.25 | User-A SID | Lead |
| 2 | deb160bb-becb-4774-9e6f-cd51cd307967 | 40-74-E0-4A-CC-D4 | 172.17.206.54 | User-A SID | Subordinate |

FIG. 3

ENABLING RESOURCE SHARING IN A MULTI-CLIENT SCENARIO

CROSS-REFERENCE TO RELATED APPLICATIONS

N/A

BACKGROUND

A multi-client scenario exists when a user connects more than one of his or her client computing devices to the same display whether directly or via an intermediate device such as a dock. In a multi-client scenario, the display's screen can be partitioned so that each client computing device can use the display's screen simultaneously. For example, a user may connect a desktop running graphic simulation software and a laptop running conferencing software to a monitor and have their respective windows simultaneously displayed on the monitor.

FIG. 1 provides an example of a multi-client scenario 100. In this example, client computing device 111 and client computing device 112 are both connected to display 120, and display 120's screen is partitioned to show a window 111a (or any other display content) pertaining to client computing device 111 and a window 112a (or any other display content) pertaining to client computing device 112.

In a multi-client scenario such as multi-client scenario 100, various problems exist. For example, in multi-client scenario 100, although window 111a and window 112a are simultaneously displayed on display 120, the underlying software will be isolated from each other on client computing device 111 and client computing device 112. Therefore, resources such as the clipboard, files, or other content cannot be shared between the two windows or their underlying software. As one specific example, if the user runs Word on client computing device 111 and a browser on client computing device 112, the user would not be able to copy and paste between Word and the browser or vice versa even though their windows may be simultaneously displayed on display 120. As another specific example, if the user runs Zoom on client computing device 111 and graphic simulation software on client computing device 112, the user would not be able to share the graphic simulation software's screen via Zoom even though they may be displayed simultaneously on display 120.

Similar limitations exist with hardware resources that may be connected to or accessible on one of client computing devices 111 or 112. For example, if a printer, storage device, or other hardware resource is connected to client computing device 111, the hardware resource will be accessible to an application running on client computing device 111 whose window is displayed on display 120 but would not be accessible to an application running on client computing device 112 whose window may simultaneously be displayed on display 120.

Accordingly, although a multi-client scenario provides the benefit of using a single display simultaneously for multiple client computing devices, the user experience can be degraded because the client computing devices otherwise remain isolated.

BRIEF SUMMARY

The present invention extends to systems, methods and computer program products for enabling resource sharing in a multi-client scenario. A service can be employed on client computing devices to detect when the client computing devices are connected to a display. The service can communicate with a management server to report when the respective client computing device is connected to a display. The management server can maintain information about the client computing devices including any displays to which they may be connected. When the management server determines that a multi-client scenario exists, such as when multiple of a user's client computing devices are connected to the same display, the management server can provide information to the services on the client computing devices to enable the services to configure the client computing devices to share resources. When the management server determines that the multi-client scenario no longer exists, it can interface with the services to cause them to prevent further sharing of resources.

In some embodiments, the present invention may be implemented as a method for enabling resource sharing in a multi-client scenario. A management server may receive information for a plurality of client computing devices. The information may include device information, display information, and user information for each of the plurality of client computing devices. The management server may detect that the display information and the user information for a first client computing device matches the display information and the user information for a second client computing device. The management server may then share the device information for the second client computing device with a service running on the first client computing device to thereby enable the service on the first client computing device to cause one or more resources to be shared between the first and second client computing devices.

In some embodiments, the present invention may be implemented as computer storage media storing computer executable instructions which when executed implement a method for enabling resource sharing in a multi-client scenario. A management server may receive information for a plurality of client computing devices. The information may include device information, display information, and user information for each of the plurality of client computing devices. The management server may detect that the display information for a first client computing device includes a first display identifier and that the display information for a second client computing device also includes the first display identifier. The management server may then share the device information for the second client computing device with a service running on the first client computing device to thereby enable the service on the first client computing device to cause one or more resources to be shared between the first and second client computing devices.

In some embodiments, the present invention may be implemented as a method for enabling resource sharing in a multi-client scenario. A service running on each of a plurality of client computing devices may collect information for the respective client computing device. The information may include device information, display information, and user information. The service running on each of the plurality of client computing devices may send the information for the respective client computing device to a management server. The management server may evaluate the information for the plurality of client computing devices to detect that a first set of client computing devices of the plurality of client computing devices are part of a multi-client scenario. The management server may then send at least some of the information for the first set of client computing devices to the services running on the first set of client computing devices. The services running on the first set of client computing devices may use the information for the first set of client computing devices to cause one or more resources to be shared in the first set of client computing devices.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 3 provides an example of data structures that may be used in some embodiments of the present invention;

DETAILED DESCRIPTION

In this specification and the claims, the term "client computing device" should be construed as encompassing any computing device that an individual may personally use such as a desktop, laptop, tablet, smart phone, etc. The term "display" should encompass any device capable of simultaneously displaying content generated by multiple client computing devices. Although embodiments of the present invention are described primarily in the context of a Windows-based implementation, the present invention could be implemented in any operating system environment that supports the described functionality.

Figure 1:
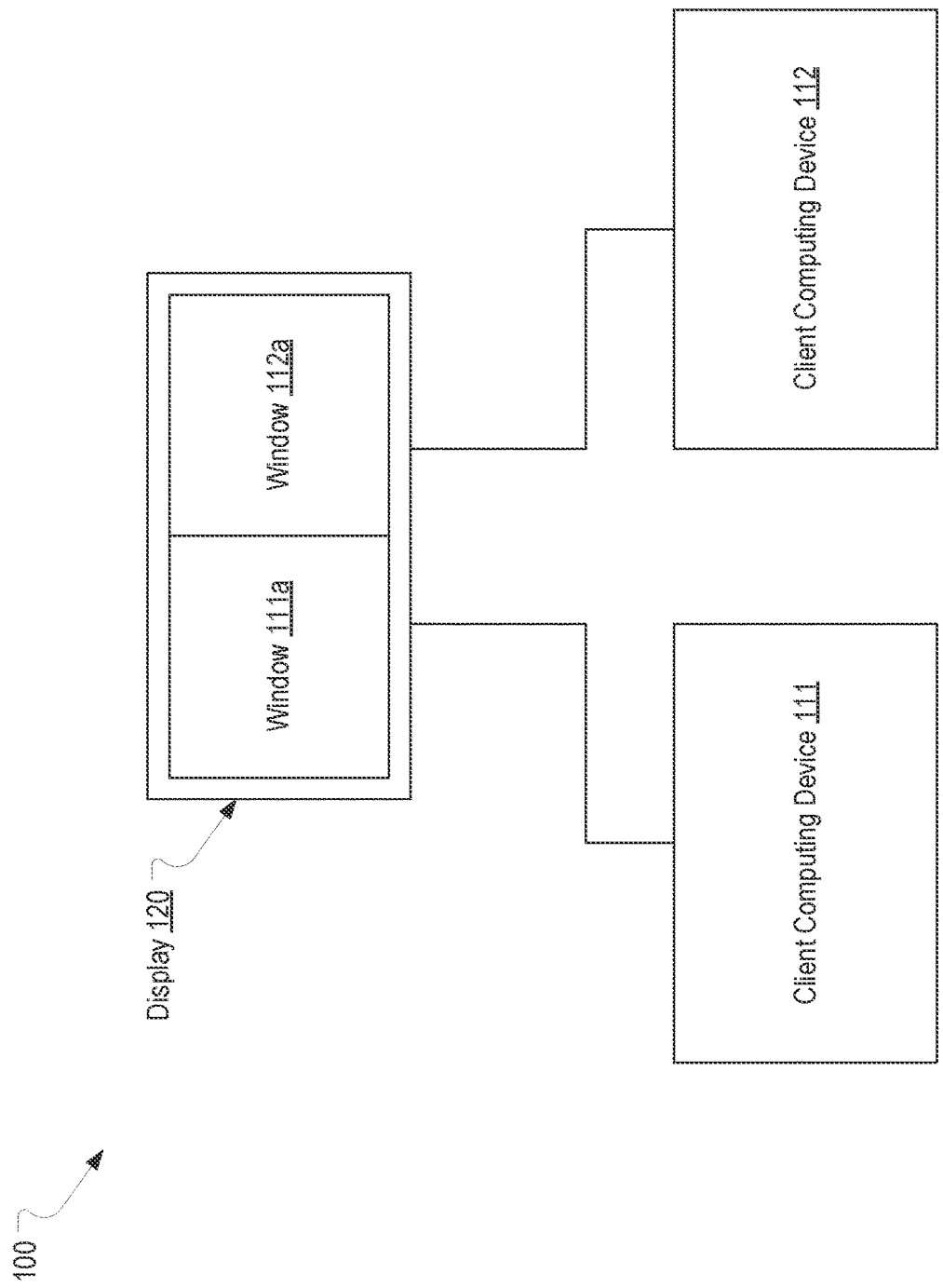
FIG. 1 provides an example of a multi-client scenario.
Figure 2:
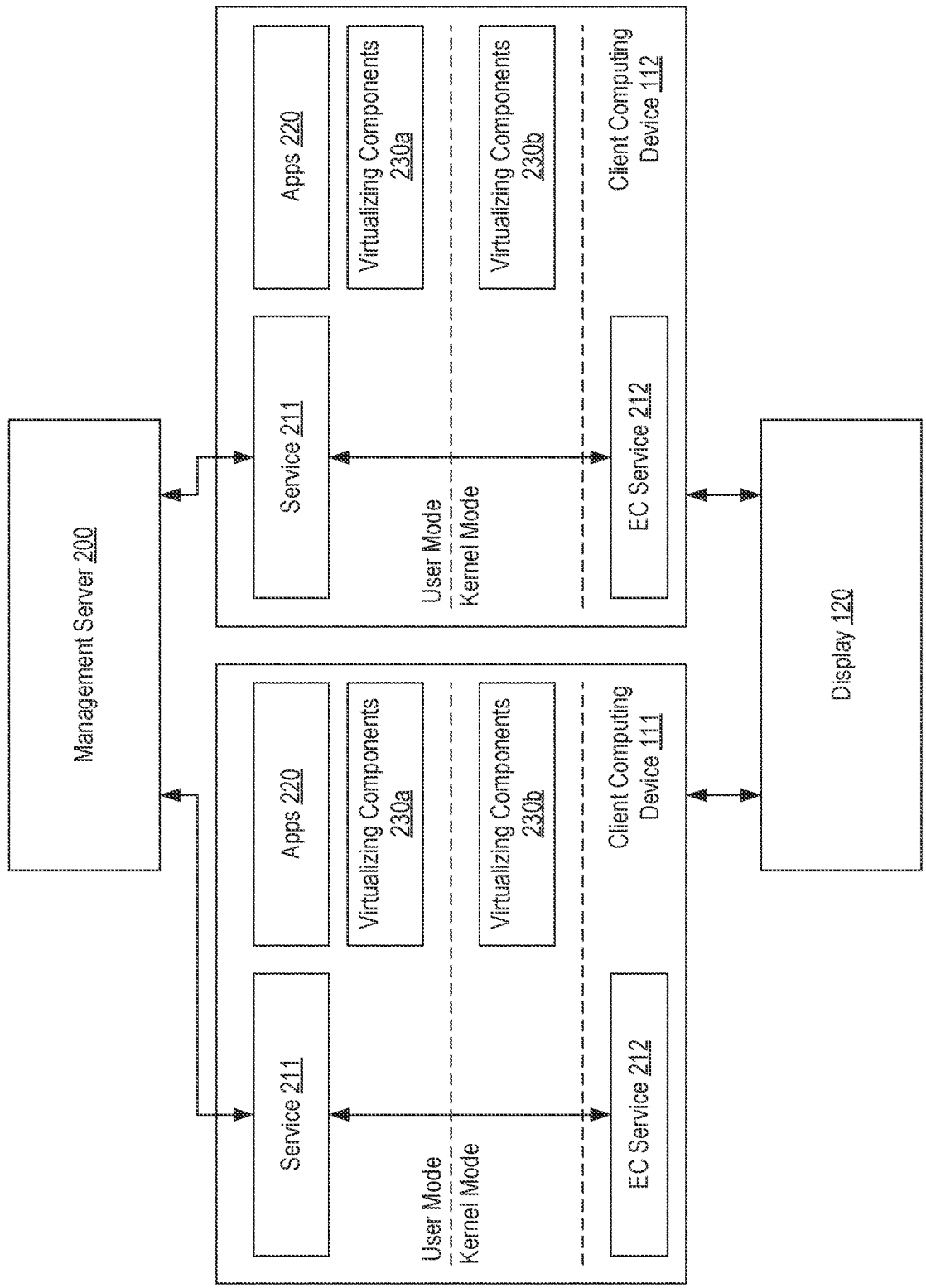
FIG. 2 provides an example of a computing environment in which embodiments of the present invention may be implemented including how client computing devices may be configured.

FIG. 2 provides an example of a computing environment 200 in which embodiments of the present invention may be implemented. Computing environment 200 includes a management server 200, client computing devices 111 and 112, and display 120. Client computing devices 111 and 112 and display 120 are capable of implementing a multi-client scenario such as is described in the background. For example, a single user, who may be logged into both client computing devices 111 and 112, can connect both client computing devices 111 and 112 to display 120 to have display 120 simultaneously display content generated on both client computing devices 111 and 112. Notably, in a multi-client scenario, there could be more than two client computing devices and the additional client computing device(s) could be configured in a similar manner as client computing devices 111 and 112.

FIG. 2 also provides an example of how each of client computing devices 111 and 112 can be configured to enable resources to be shared between client computing devices 111 and 112 when the client computing devices are part of a multi-client scenario. For example, each of client computing devices 111 and 112 can include a service 211, an embedded controller (EC) service 212, any number or type of applications 220, user mode virtualizing components 230a and kernel mode virtualizing components 230b (collectively virtualizing components 230), among other components Management server 200 can represent any service(s) hosted in a network accessible location such as in the cloud so that each instance of service 211 and management server 200 can intercommunicate. As one example only, management server 200 could be a component of a cloud-based management solution that a company or other entity uses to manage its employees' or other users' client computing devices. In embodiments of the present invention, a primary function of management server 200 is to assist an instance of service 211 running on the respective client computing device to discovery one or more other client computing devices that are part of a multi-client scenario for purposes of sharing resources.

EC service 212 can represent a service that may run on an embedded controller or other low-level component. In embodiments of the present invention, a primary function of EC service 212 is to detect and identify displays, docks, KVM switches, or other devices to which the respective client computing device may be connected.

Service 211 can represent a user-mode component or any other component capable of performing the functionality described herein to enable resources to be shared between or among multiple client computing devices in a multi-client scenario. As described in detail below, service 211 can interface with EC service 212, management server 200, the operating system, and possibly other components to perform such functionality.

Virtualizing components 230 can represent any suitable components for allowing resources to be shared between multiple client computing devices. For example, if a printer is connected to one of the client computing devices, virtualizing components 230 may include drivers for printing using remote desktop protocol techniques from another client computing device in the multi-client scenario. Similarly, if a storage drive is connected to one of the client computing devices, virtualizing components 230 may include software for allowing the storage drive to be accessed from the other client computing devices in the multi-client scenario (e.g., the VirualHere client or server). Virtualizing components 230 could also include components for sharing software resources such as a clipboard, a virtual private network, URL redirection, etc. Embodiments of the present invention are not limited to any particular type or functionality of virtualizing components 230 but are intended to support and function with a wide range of virtualizing components.

Applications 220 can represent any application that could be run on a client computing device. Of relevance to embodiments of the present invention, a user may be able to access a shared resource from applications 220. For example, a user running Word on client computing device 111 may be able to print a Word document on a printer that is physically connected to client computing device 112 or copy and paste content between Word and an application running on client computing device 112. Similarly, a user participating in a conference call via Zoom running on client computing device 112 could access a file stored on a storage device connected to client computing device 111 or otherwise access a device connected to client computing device 111.

As an overview, embodiments of the present invention can be implemented to automatically discover client computing devices that are part of a multi-client scenario and to also seamlessly enable the sharing of resources between or among such client computing devices while they are part of the multi-client scenario. When embodiments of the present invention are implemented, the user will not need to take manual action to configure the sharing of resources between multiple client computing devices he or she may be simultaneously using.

As part of implementing some embodiments of the present invention, various data structures may be created and maintained. For example, management server 200 may be configured to populate tables or any other suitable data structure using information received from instances of service 211 running on any client computing device that it manages. FIG. 3 provides an example of two types of tables that management server 200 may maintain in some embodiments.

Client computing device table 301 (or device table 301) can be used to define information about client computing devices that are part of or may become part of a multi-client scenario (i.e., client computing devices that management server 200 may manage for purposes of sharing resources in a multi-client scenario). This information may include information about the client computing device ("device information") such as a universally unique ID (UUID) such as a MachineGUID, an SMBIOS UUID, etc., a MAC address, an IP address, and a state, information about a display to which the client computing device may be connected ("display information") such as a display UUID (e.g., a serial number obtained from the extended display identification data), and information about the user of the client computing device ("user information") such as the user's security identifier (SID) or other user identifier and the user's state relative to the client computing device (e.g., whether the user is logged in). As described in detail below, service 211 can provide such device information, display information, and user information to management server 100 and update it as appropriate such as when any such information changes.

In the example in FIG. 3, device table 301 includes two entries pertaining to User A and one entry pertaining to User B but may oftentimes include many entries. The two entries pertaining to User A indicate that User A is logged in to two different client computing devices both of which are connected to a display. Also, the display information in these two entries match thereby indicating that the two different client computing devices are connected to the same display. Accordingly, the presence of these two entries in device table 301 indicates that User A has created a multi-client scenario (i.e., User A has connected his or her two client computing devices to the same display).

Management server 200 can employ device table 301 to detect multi-client scenarios. When it detects a multi-client scenario, management server 200 can create a display-specific table 302 for the multi-client scenario. Therefore, although FIG. 3 shows a single display-specific table 302, management server 200 could maintain many display-specific tables 302, one for each multi-client scenario that it detects from the information in device table 301.

In FIG. 3, display-specific table 302 represents the multi-client scenario that User A has created. In other words, display-specific table 302 corresponds with the first and third entries in device table 301. Display-specific table 302 can define or be associated with the display UUID, which in this example is BBDE08FF, and may include an entry for each client computing device that is part of the multi-client scenario. For example, assuming that User A has connected only two devices to the display having the display UUID of BBDE08FF, display-specific table 302 can include two entries. Each of these entries can include at least some of the corresponding device information (e.g., the device's UUID, MAC and IP), at least some of the user information (e.g., the user's SID), and a role of the device (e.g., whether the device is the lead or subordinate device). In some embodiments, management server 200 can select the role for each client computing device in the multi-client scenario. As described in further detail below, when a client computing device is the lead, the instance of service 211 on that device will initiate a connection with the subordinate client computing device(s) for purposes of enabling resources to be shared.

Figure 4A:
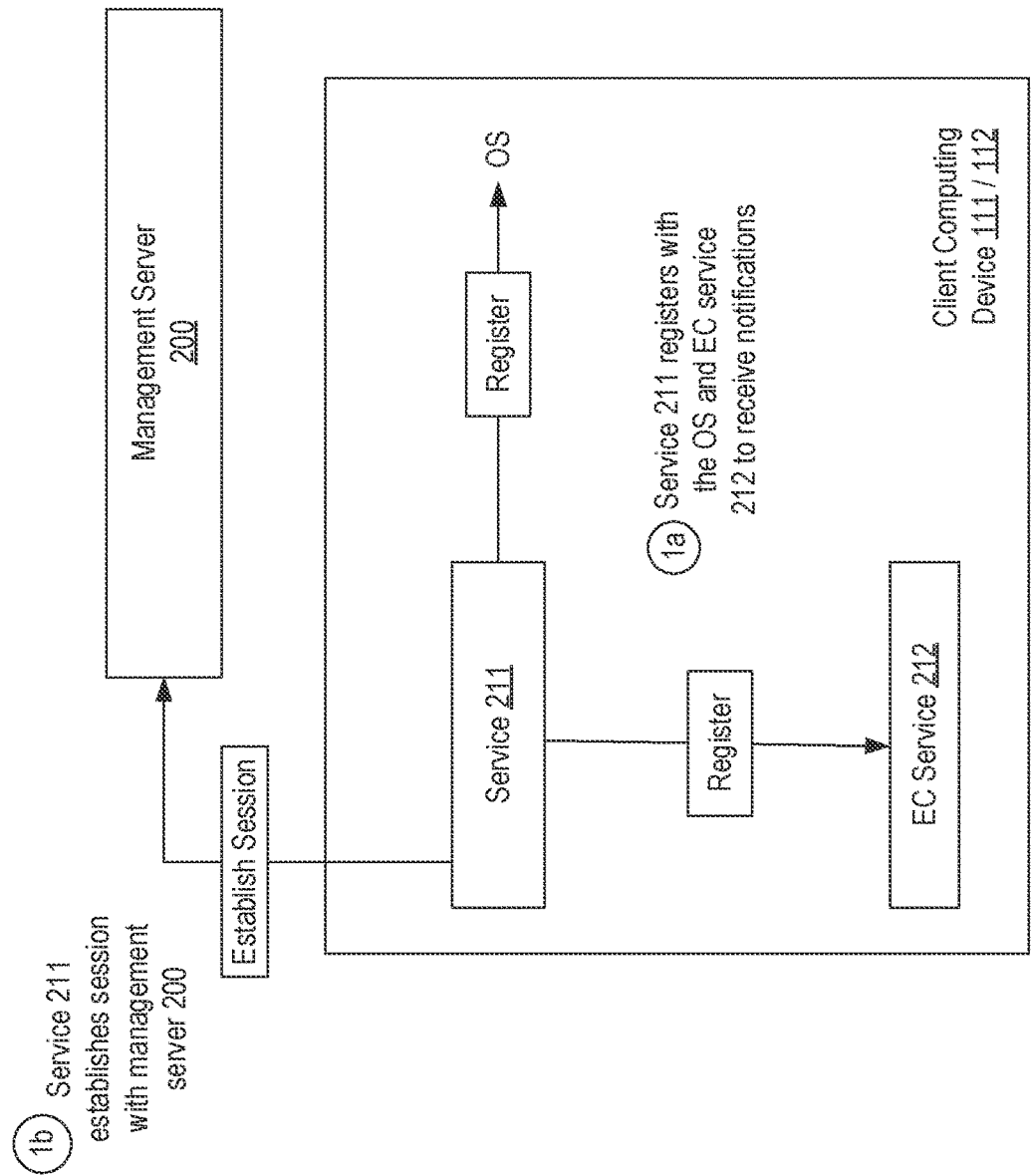
FIGS. 4A-4C provide an example of initial functionality that may be performed in some embodiments of the present invention.
Figure 4B:
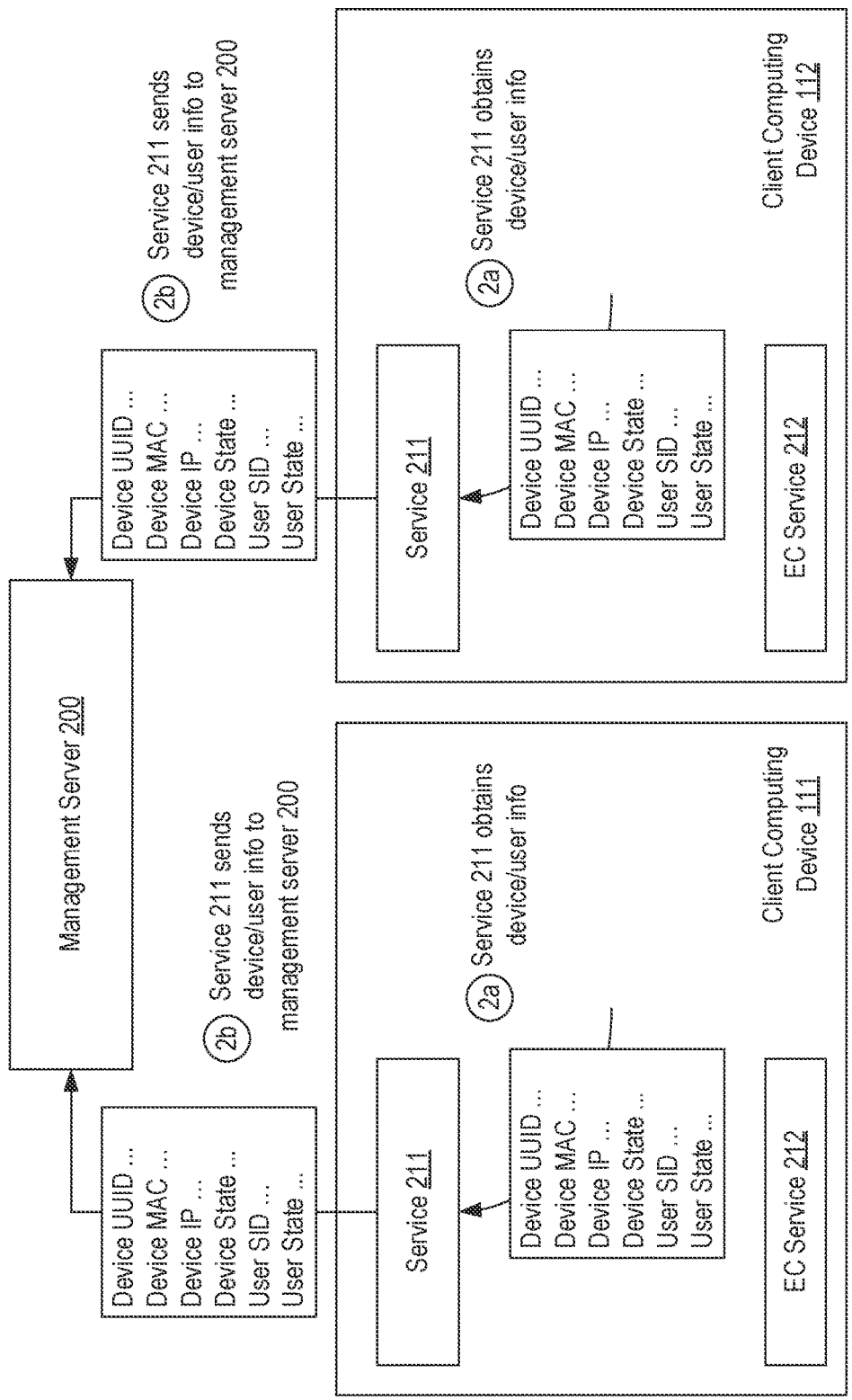
Figure 4C:
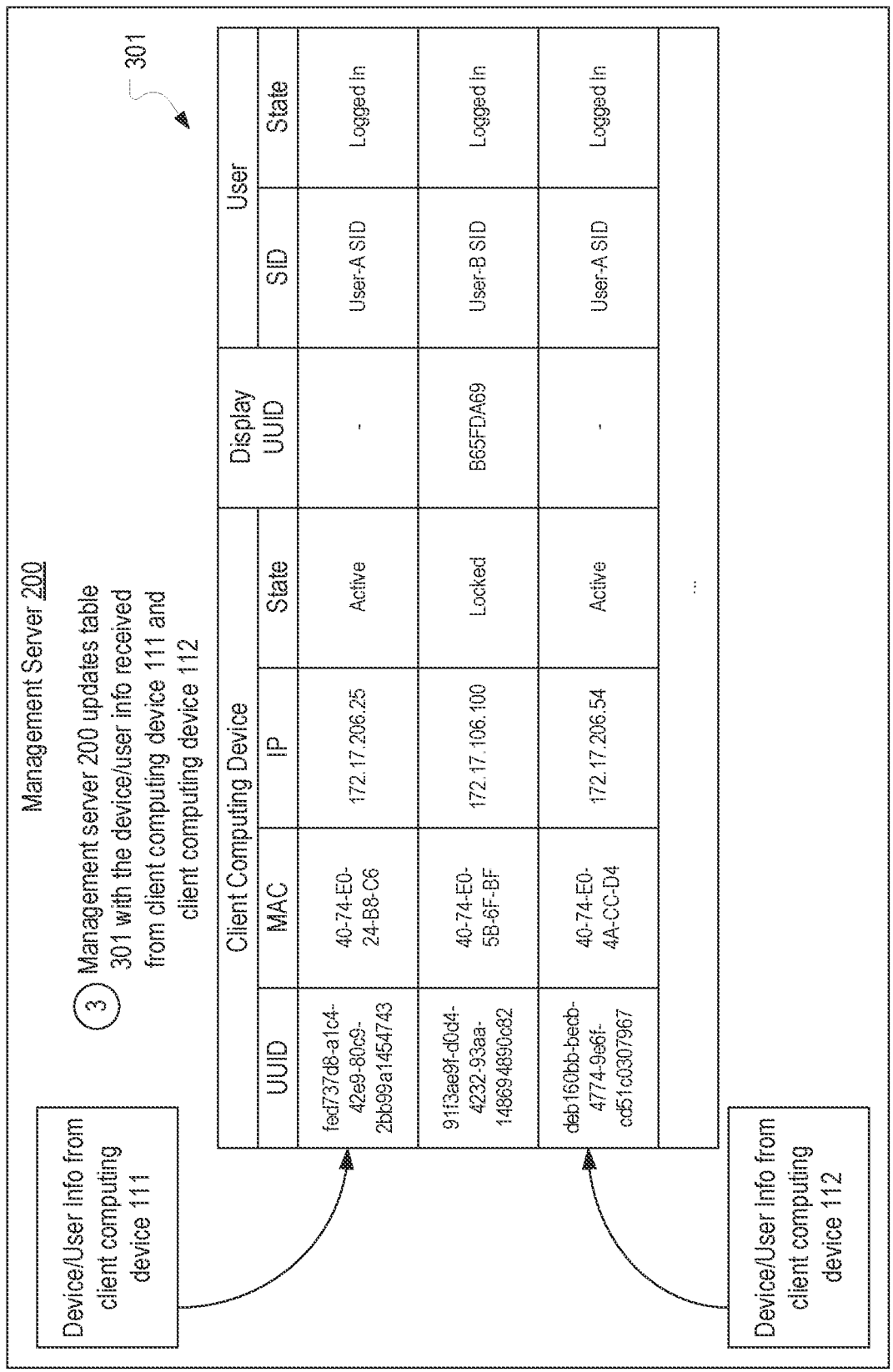

FIGS. 4A-4C provide an example of initial functionality that may be performed in some embodiments of the present invention to populate portions of device table 301. This functionality may be performed on each client computing device that management server 200 manages including client computing devices 111 and 112.

Turning to FIG. 4A, it is assumed that service 211 has been loaded which may occur as part of startup or at any other suitable time. In step 1a, service 211 can register with the operating system and with EC service 212 to receive notifications. For example, service 211 could register with the operating system to receive notifications when devices (e.g., printers, storage devices, etc.) are connected to or disconnected from the client computing device, when the user logs in or logs out, etc. Service 211 could register with EC service 212 to receive notifications when a display, dock, or other device is connected to the client computing device (e.g., via WMI/ACPI). In step 1b, service 211 can also establish a session with management server 200 (e.g., via any suitable network connection).

Turning to FIG. 4B, in step 2a, service 211 can obtain device information (e.g., by reading a registry key containing the MachineGUID, by using the GetSystemFirmwareTable function to obtain the SMBIOS UUID, by using the GetAdaptersAddresses function to obtain the MAC and IP addresses, etc.) and user information (e.g., via a call to the GetTokenInformation function), and in step 2b, can relay such information to management server 200. In this example, it is assumed that client computing devices 111 and 112 are not yet connected to display 120. However, step 2a and 2b could entail obtaining display information and relaying it to management server 200 if the respective client computing device is connected to a display at that time. Notably, steps 2a and 2b are performed independently on each client computing device and could occur at any suitable time. Also, service 211 could send the device information separately from the user information such as when the user is not yet logged in when service 211 sends the device information.

Turning to FIG. 4C, in step 3, management server 200 can update device table 301 based on the device information and user information it has received from the instance of service 211 running on client computing devices 111 and 112. In this example, device table 301 matches what is shown in FIG. 3 except that the display UUID is not populated for either entry based on the assumption that neither client computing device 111 or 112 has been connected to display 120.

Steps 2a, 2b and 3 can be repeated as appropriate to ensure that device table 301 remains up to date. For example, if client computing device 111 or 112 is locked, sleeps, shuts down, etc., or if the user logs out or another user logs in, service 211 can relay the updated state. Also, if User A connects client computing device 111 or 112 to display 120, EC service 212 would notify service 211 and provide the display UUID and service 211 could relay the display UUID to management server 200 to populate the respective entry in device table 301. Likewise, if User A disconnects client computing device 111 or 112 from display 120, EC service 212 would notify service 211 who in turn could notify management server 200 to update the respective entry (e.g., to delete the display UUID).

Based on the state of device table 301 in FIG. 4C, management server 200 can know that User A is logged in to two different client computing devices but will determine that these two client computing devices are not part of a multi-client scenario because they are not connected to the same display. The same would be true if the two client computing devices were connected to two different displays (e.g., if the display UUIDs did not match).

FIGS. 5A-5G provide an example of how service 211 can enable management server 200 to automatically detect a multi-client scenario and how management server 200 can enable service 211 to seamlessly initiate the sharing of resources between the client computing devices in the multi-client scenario.

Figure 5A:
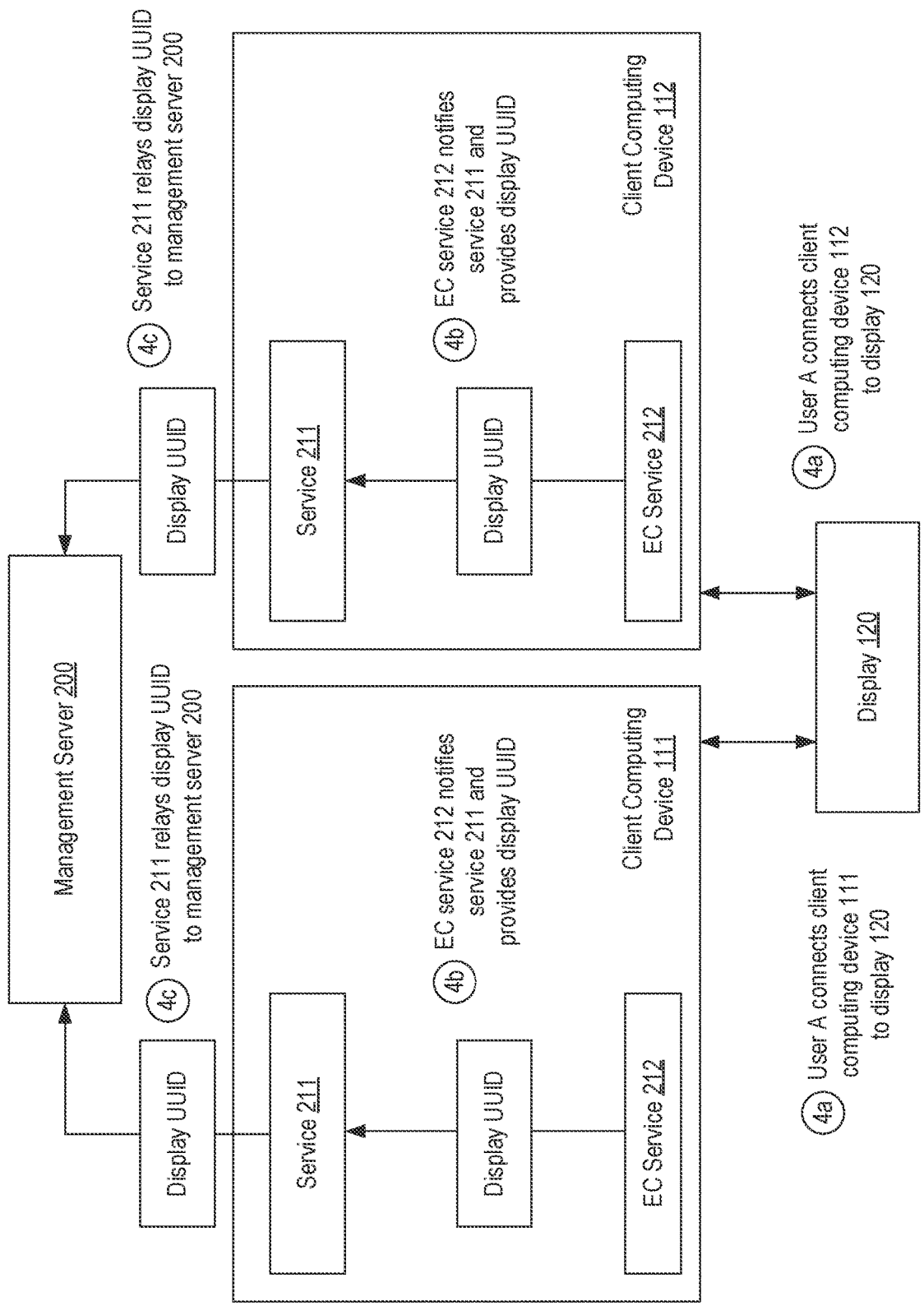
FIGS. 5A-5G provide an example of how client computing devices in a multi-client scenario can be automatically detected and how resources can be seamlessly shared between the client computing devices while they are in the multi-client scenario.

Turning to FIG. 5A, in step 4a, it is assumed that user A connects client computing device 111 and client computing device 112 to display 120, whether directly or via a dock or other device. User A could connect client computing devices 111 and 112 to display 120 at any suitable time, and therefore, FIG. 5A should not be interpreted as requiring the connections to occur at the same time. In step 4b, EC service 212 can detect the connection to display 120, obtain the display UUID (e.g., from the display 120's EDID), and provide it to service 211 (e.g., as part of reporting the connection event). Then, in step 4c, service 211 can relay the display UUID to management server 200. Although not shown, in some embodiments, service 211 could provide the display UUID in conjunction with at least some of the device information and/or user information to enable management server 200 to identify the corresponding entry in device table 301. Again, steps 4b and 4c could occur independently on each of client computing devices 111 and 112 whenever the client computing device may be connected to display 120 (or another display). Also, similar steps could be performed if/when client computing device 111 or 112 is disconnected from display 210.

Figure 5B:
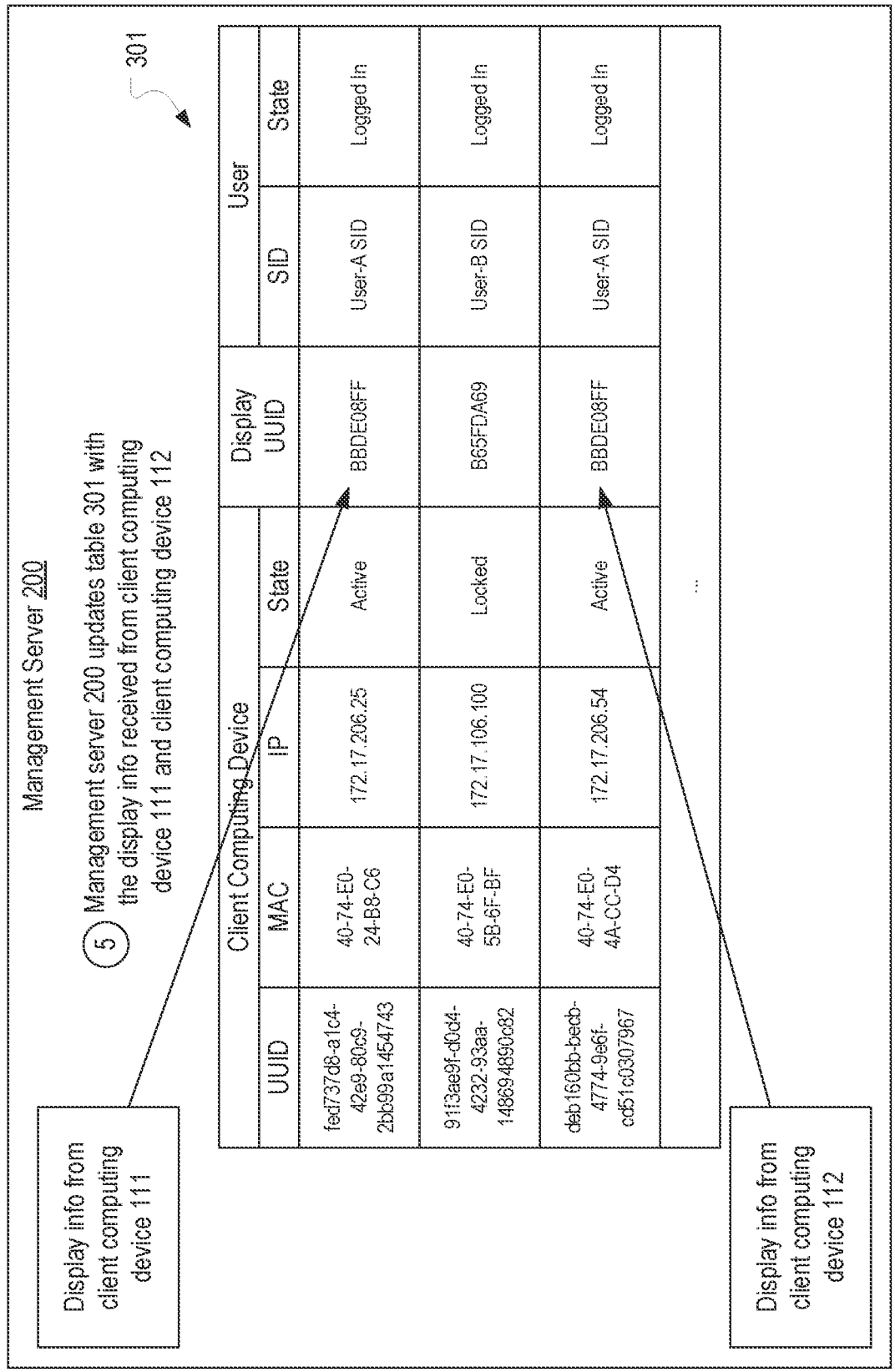

Turning to FIG. 5B, in step 5, management server 200 can update device table 301 in response to receiving display information from service 211 on each of client computing devices 111 and 112. In this example, it is assumed that display 120 has a display UUID of BBDE08FF, and therefore, the respective entries in device table 301 are populated with this display UUID. For purposes of this example, it will be assumed that User A connected client computing device 111 to display 120 first and therefore the display UUID would have been populated in the first entry in device table 301 while the display UUID in the third entry remained blank. At that time, management server 200 would have determined that client computing device 111 and client computing device 112 are not part of a multi-client scenario. In contrast, once User A connected client computing device 112 to display 120, the same display UUID would have been populated in the third entry in device table 301 such as is shown in FIG. 5B.

Figure 5C:
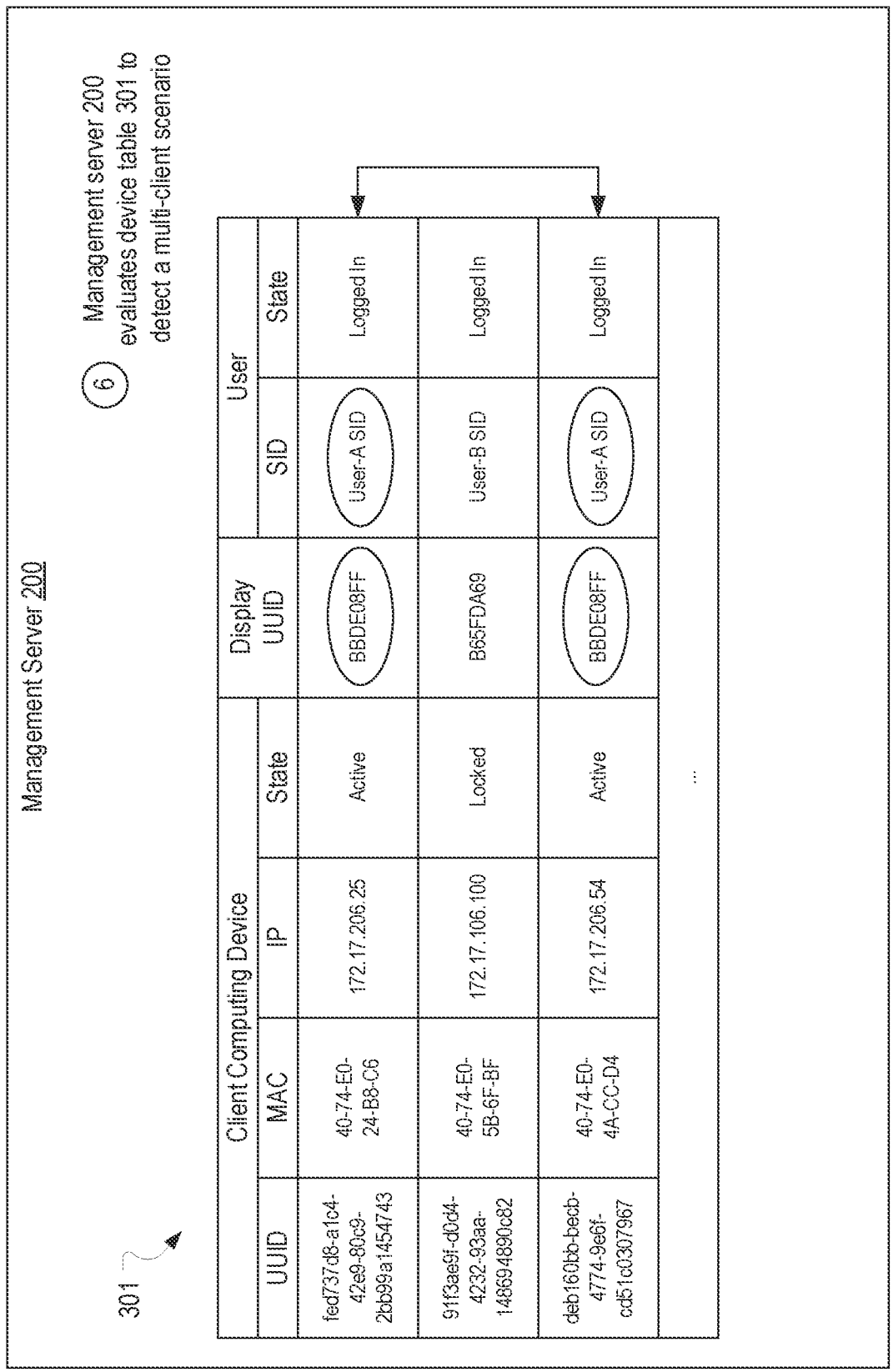

Turning to FIG. 5C, in step 6, which management server 200 could perform at any time such as whenever it updates device table 301, management server 200 can evaluate device table 301 to detect whether any multi-client scenarios exist. In other words, management server 200 can determine whether the same user has connected multiple client computing devices to the same display. For example, management server 200 could evaluate device table 301 to identify whether multiple entries have the same user SID and the same display UUID. In this example, management server 200 will determine that the first and third entries both have a user SID of User-A SID and a display UUID of BBDE08FF.

Figure 5D:
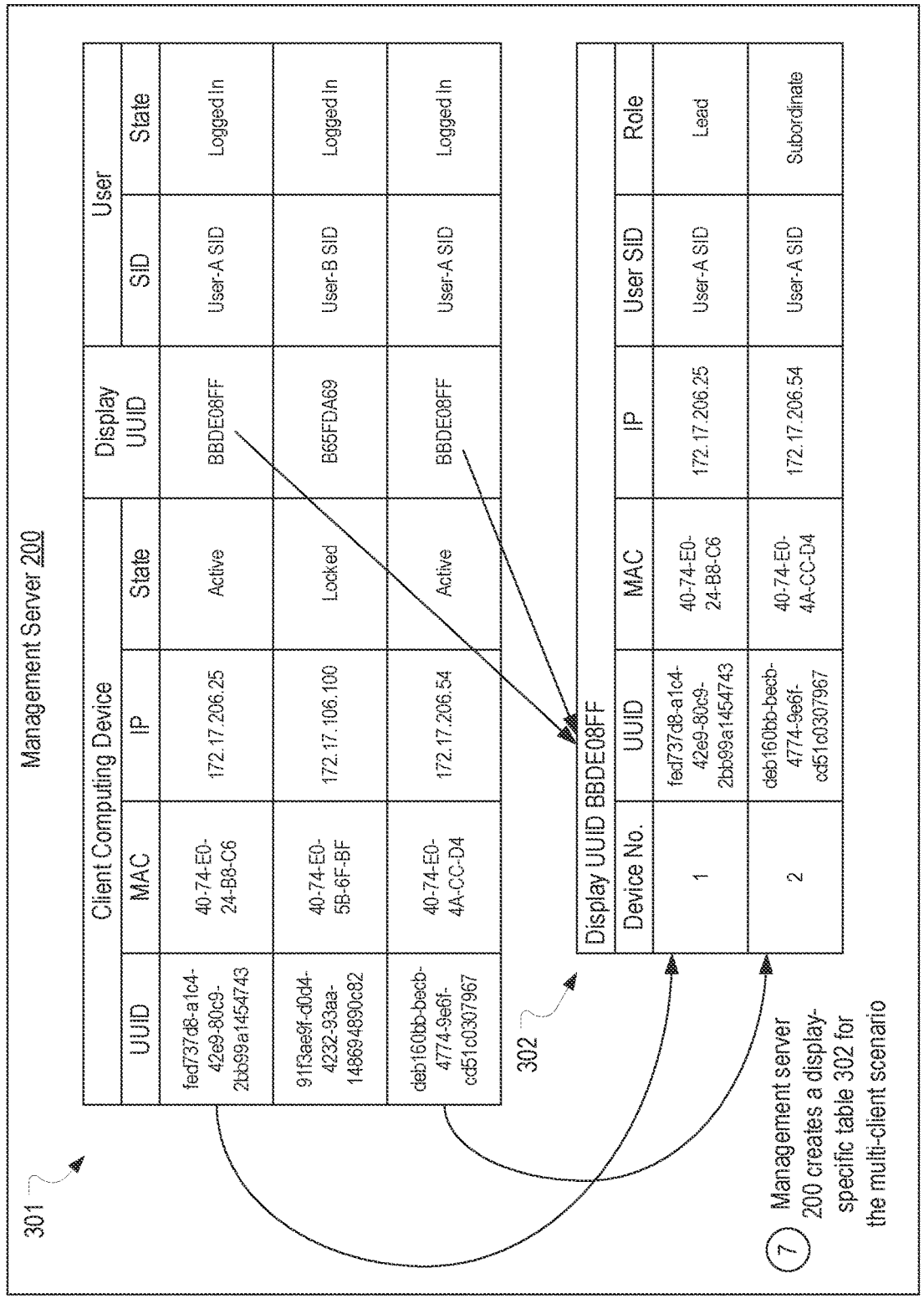

Turning to FIG. 5D, in step 7, and in response to detecting the multi-client scenario, management server 200 can create a display-specific table 302 that groups User A's client computing device 111 and User A's client computing device 112 because they are connected to the same display 120. As part of creating display-specific table 302, management server 200 may designate one of client computing devices 111 or 112 as the lead. Notably, if User A connected an additional client computing device to display 120, a corresponding entry could be added to display-specific table 302.

Figure 5E:
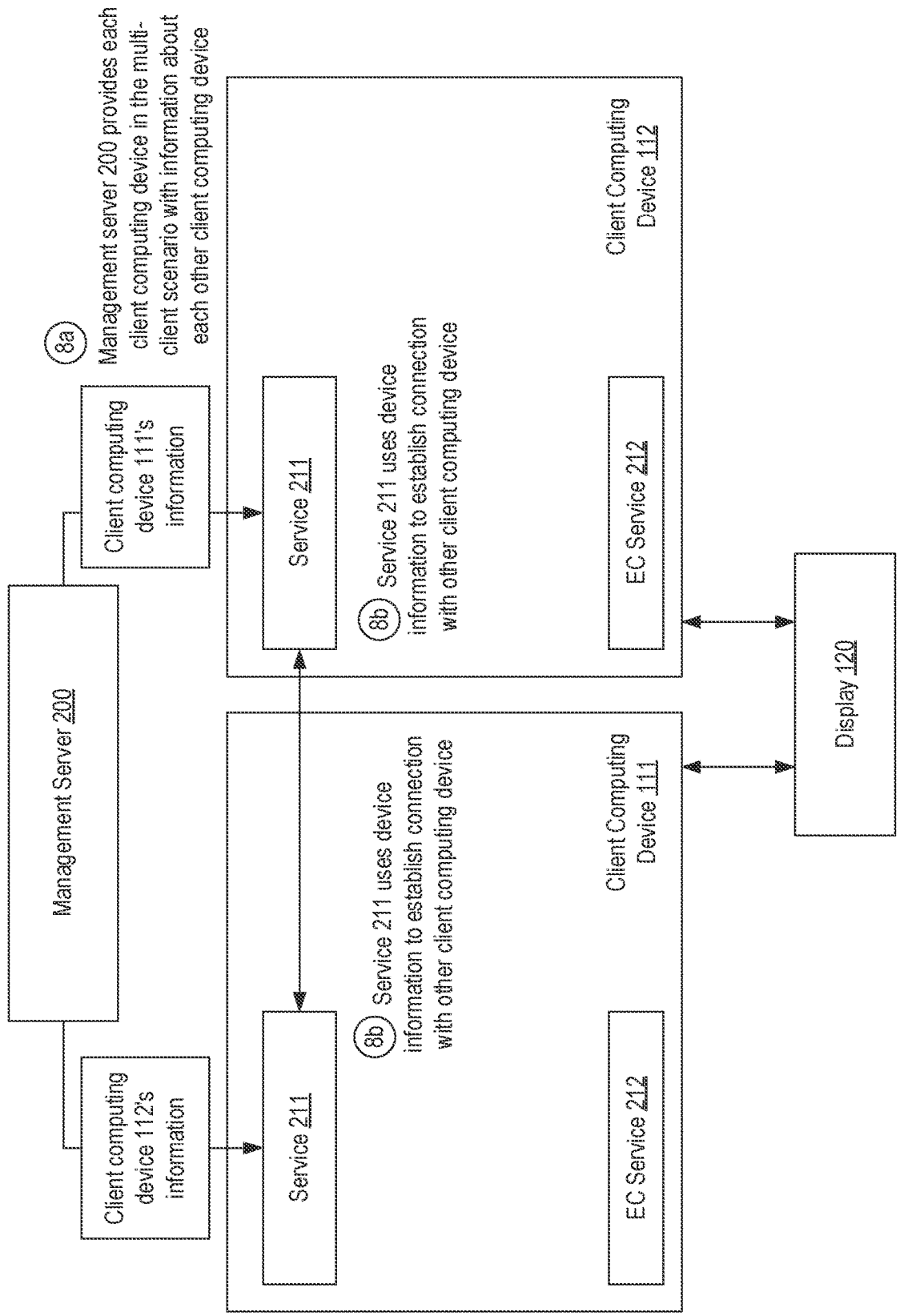

Turning to FIG. 5E, in step 8a, management server 200 can provide service 211 with at least some of the device information for each other client computing device in the multi-client scenario. For example, management server 200 may provide service 211 on client computing device 111 with the device information for client computing device 112 such as client computing device 112's MAC address and IP address, and may provide service 211 on client computing device 112 with the device information for client computing device 111 such as client computing device 111's MAC address and IP address. Also, as part of step 8a, management server 200 may notify each instance of service 211 of what its role is in the multi-client scenario (e.g., whether it is the lead or subordinate). In some embodiments, management server 200 may share display-specific table 302 with service 211 to provide such information. Accordingly, after step 8a, each service 211 will know of each other client computing device in the multi-client scenario and will have network information for communicating with the instance of service 211 on each other client computing device in the multi-client scenario.

In step 8b, service 211 can use the device information it received from management server 200 to establish a connection to service 211 on each other client computing device. For example, assuming that client computing device 111 is designated as the lead, service 211 on client computing device 111 may establish a communication channel with service 211 on client computing device 112 (e.g., by using client computing device 112's MAC address and/or IP address provided in step 8a).

Figure 5F:
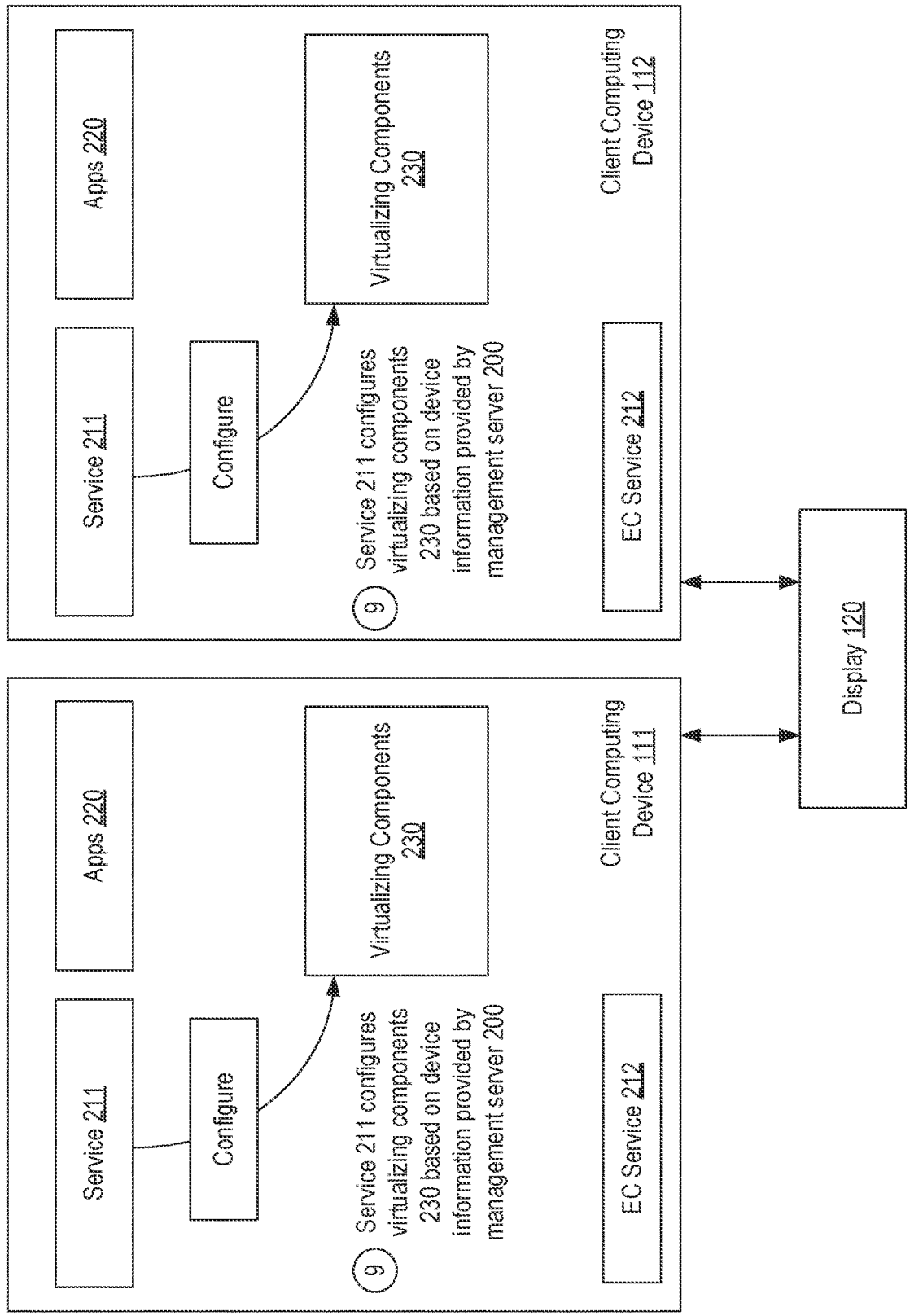

Turning to FIG. 5F, in step 9, service 211 can configure virtualizing components 230 based on the device information it received from management server 200. Step 9 may vary based on the type of virtualizing components 230 that may be available on each client computing device. In general, step 9 may entail using the MAC address, IP address, and/or other network information to configure virtualizing components 230 to enable resources to be shared between client computing devices in the multi-client scenario.

Figure 5G:
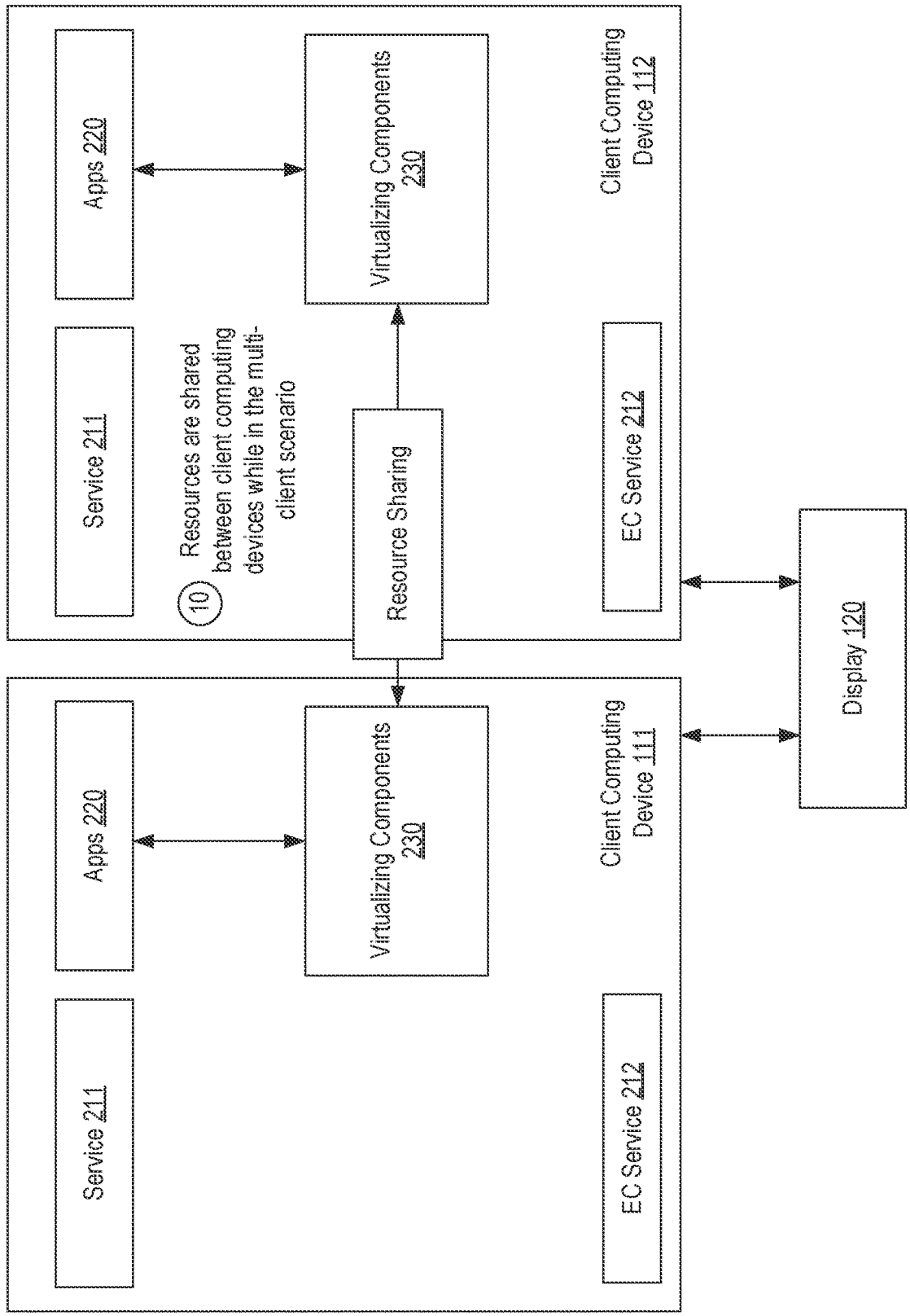

Finally, turning to FIG. 5G, in step 10 and once service 211 has configured virtualizing components 230, apps 220 (or other components) can commence sharing resources between client computing devices 111 and 112. As stated above, this resource sharing could include any software resources or hardware resources that may be available on client computing device 111 or client computing device 112.

Although not shown in the figures, EC service 212, service 211 and management server 200 may perform a generally reverse process when client computing device 111 or 112 is disconnected from display 120 (or whenever the multi-client scenario ceases). For example, if User A disconnects client computing device 112 from display 120, EC service 212 can report the disconnect event to service 211 which can relay the disconnect to management server 200. Management server 200 could then update device table 301 accordingly such as by deleting the display UUID from the entry pertaining to client computing device 112. Assuming that User A has not connected another client computing device to display 120, management server 200 could then determine that only one entry in device table 301 includes the display UUID of BBDE08FF (i.e., that client computing device 111 and client computing device 112 are no longer part of a multi-client scenario) and can delete display-specific table 302. Management server 200 can also notify service 211 on client computing device 111 and client computing device 112 to instruct them to stop sharing resources. Services 211 could then interface with virtualizing components 230 to prevent further resource sharing.

As can be seen, embodiments of the present invention enable the automatic discovery of client computing devices that are participating in a multi-client scenario and the seamless configuration of the client computing devices to implement resource sharing while they remain part of the multi-client scenario. Likewise, embodiments of the present invention enable the automatic detection of when a multi-client scenario no longer exists and the automatic termination of resource sharing.

In some embodiments, EC service 212 may obtain a unique identifier of a different device such as a dock, a KVM switch or similar device by which the client computing devices may connect to a display and such an identifier may be used in the same manner as the display UUID is used as described above. By using a unique identifier of such a device, a multi-client scenario could be detected at the level of such a device rather than at the level of the display. For example, a multi-client scenario, including the sharing of resources within the multi-client scenario, could be based on client computing devices connected to the same dock, the same KVM Switch, etc.

In some embodiments, management server 200 may maintain policies defining which resources may be shared in a multi-client scenario. For example, the policies could define whether particular resources may be shared based on the user, the client computing device, or some other parameter. Similarly, such policies could define which client computing devices may become part of a multi-client scenario.

In some embodiments, the above-described techniques could be implemented to enable the sharing of resources between client computing devices that different users may be using in a multi-client scenario. In other words, a multi-client scenario may be formed when different users connect their client computing devices to the same display.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for enabling resource sharing in a multi-client scenario, the method comprising:
receiving, at a management server, information for a plurality of client computing devices, the information including device information, display information, and user information for each of the plurality of client computing devices;
detecting, by the management server, that a user has connected a first client computing device and a second client computing device to a display to create a multi-client scenario by determining that the display information and the user information for the first client computing device matches the display information and the user information for the second client computing device; and
in response to detecting that the user has connected the first client computing device and the second client computing device to the display to create the multi-client scenario, sharing, by the management server, the device information for the second client computing device with a service running on the first client computing device to thereby enable the service on the first client computing device to cause one or more resources to be shared between the first and second client computing devices.

2. The method of claim 1, further comprising:
sharing, by the management server, the device information for the first client computing device with a service running on the second client computing device.

3. The method of claim 1, wherein the display information includes a display identifier.

4. The method of claim 3, wherein detecting that the display information for the first client computing device matches the display information for the second client computing device comprises detecting that the display information for the first client computing device and for the second client computing device includes a same display identifier.

5. The method of claim 1, wherein the user information includes a user identifier.

6. The method of claim 5, wherein detecting that the user information for the first client computing device matches the user information for the second client computing device comprises detecting that the user information for the first client computing device and for the second client computing device includes a same user identifier.

7. The method of claim 1, wherein the device information includes one or both of a MAC address or an IP address.

8. The method of claim 1, further comprising:
receiving, at the management server, an update to the information for the second client computing device;
in response to receiving the update, detecting, by the management server, that the display information for the second client computing device does not match the display information for the first client computing device; and
sending, by the management server, a notification to the service running on the first client computing device to instruct the service running on the first client computing device to cause the one or more resources to no longer be shared between the first and second client computing devices.

9. The method of claim 8, further comprising:
sending, by the management server, a notification to the service running on the second client computing device to instruct the service running on the second client computing device to cause the one or more resources to no longer be shared between the first and second client computing devices.

10. The method of claim 1, wherein the one or more resources include one or more software or hardware resources.

11. The method of claim 1, wherein the management server stores the information for the plurality of client computing devices in a first table, and wherein, in response to detecting that the display information and the user information for a first client computing device matches the display information and the user information for a second client computing device, the management server creates a second table to store at least some of the information for the first and second client computing devices.

12. The method of claim 11, wherein sharing the device information comprises sharing the second table.

13. The method of claim 1, further comprising:
interfacing, by the service running on the first client computing device, with virtualizing components on the first client computing device to thereby cause the one or more resources to be shared between the first and second client computing devices.

14. One or more computer storage media storing computer executable instructions which when executed implement a method for enabling resource sharing in a multi-client scenario, the method comprising:
receiving, at a management server, information for a plurality of client computing devices, the information including device information, display information, and user information for each of the plurality of client computing devices;
detecting, by the management server, that a user has connected a first client computing device and a second client computing device to a display to create a multi-client scenario by determining that the display information for the first client computing device includes a first display identifier and that the display information for the second client computing device also includes the first display identifier; and
in response to detecting that the user has connected the first client computing device and the second client computing device to the display to create the multi-client scenario, sharing, by the management server, the device information for the second client computing device with a service running on the first client computing device to thereby enable the service on the first client computing device to cause one or more resources to be shared between the first and second client computing devices.

15. The computer storage media of claim 14, wherein the method further comprises:
detecting, by the management server, that the user information for the first client computing device includes a first user identifier and that the user information for the second client computing device also includes the first user identifier.

16. The computer storage media of claim 14, wherein the method further comprises:
detecting, by the management server, that the display information for the second client computing device no longer includes the first display identifier; and
instructing, by the management server, the service running on the first client computing device to prevent the one or more resources from being shared between the first and second client computing devices.

17. A method for enabling resource sharing in a multi-client scenario, the method comprising:
collecting, by a service running on each of a plurality of client computing devices, information for the respective client computing device, the information including device information, display information, and user information;
sending, by the service running on each of the plurality of client computing devices, the information for the respective client computing device to a management server;
evaluating, by the management server, the information for the plurality of client computing devices to detect that a first set of client computing devices of the plurality of client computing devices are associated with a user and connected to a display to thereby form a multi-client scenario;
sending, by the management server, at least some of the information for the first set of client computing devices to the services running on the first set of client computing devices; and using, by the services running on the first set of client computing devices, the information for the first set of client computing devices to cause one or more resources to be shared in the first set of client computing devices.

18. The method of claim 17, wherein detecting that the first set of client computing devices are part of the multi-client scenario comprises detecting that the information for the first set of client computing devices indicates that a same user is logged into each of the first set of client computing devices and that each of the first set of client computing devices is connected to a same display.

19. The method of claim 1, wherein using the information for the first set of client computing devices to cause one or more resources to be shared in the first set of client computing devices comprises configuring virtualizing components using device information defined in the information for the first set of client computing devices.

20. The method of claim 1, further comprising:
receiving, at the management server, an update to the information for the first set of client computing devices;
in response to receiving the update, detecting that the first set of client computing devices are no longer part of the multi-client scenario;
sending, by the management server, a notification to the services running on the first set of client computing devices; and
in response to receiving the notification, causing, by the services running on the first set of client computing devices, the one or more resources to no longer be shared.

* * * * *